United States Patent [19]
Petrovich et al.

[11] Patent Number: 5,715,902
[45] Date of Patent: Feb. 10, 1998

[54] RETROFIT UNIT FOR VEHICLE STEERING MECHANISM

[75] Inventors: Paul A. Petrovich, Fowlerville; Jack G. Rodgers, Roseville; John J. Schmitz, St. Clair Shores, all of Mich.

[73] Assignee: The United States of America as represented by the Secretary of the Army, Washington, D.C.

[21] Appl. No.: 605,302

[22] Filed: Jan. 29, 1996

[51] Int. Cl.⁶ ........................................ B62D 1/24
[52] U.S. Cl. ............................ 180/167; 180/443
[58] Field of Search ........................ 180/167, 168, 180/401, 443, 444; 74/488, 494, 496

[56] References Cited

U.S. PATENT DOCUMENTS

| | | | |
|---|---|---|---|
| 2,791,915 | 5/1957 | Merry | 74/494 |
| 3,648,539 | 3/1972 | Rouis | 180/443 |
| 4,083,422 | 4/1978 | Blakeslee et al. | 180/168 |
| 5,121,799 | 6/1992 | Barnes et al. | 180/401 |
| 5,351,778 | 10/1994 | Shigemi et al. | 180/167 |

FOREIGN PATENT DOCUMENTS

| | | | |
|---|---|---|---|
| 853110 | 10/1952 | Germany | 74/494 |
| 404066363 | 3/1992 | Japan | 180/168 |

*Primary Examiner*—Brian L. Johnson
*Assistant Examiner*—Frank Vanaman
*Attorney, Agent, or Firm*—Peter A. Taucher; David L. Kuhn

[57] ABSTRACT

A retrofit mechanism adapts a pre-existing manually steered vehicle for both manual and powered remote steering control. The mechanism's steering control subassembly mounts to a bridge of a rigid adaptor assembly fixed to the vehicle's frame. A control subassembly post passes rotatably through a web of the adaptor's bridge. The post is rotated by a motorized steering actuator mounted to a side of the bridge. A symmetric wing fixed to the post pivotally connects with two rods, which themselves pivotally connect an adapter element on the steering column. The rods lie on opposite sides of, and equidistantly from, a line extending from the central axis to the steering column axis. The wing, rods and adapter element cooperate to achieve nonbinding rotation of the vehicle's steering column within a sleeve surrounding the column.

6 Claims, 3 Drawing Sheets

RETROFIT UNIT FOR VEHICLE STEERING MECHANISM

GOVERNMENT USE

The invention described here may be made, used and licensed by or for the U.S. Government for governmental purposes without paying us royalty.

BACKGROUND AND SUMMARY

Currently the U.S. Army is investigating methods to remove unexploded shells from artillery ranges and secured battle zones. One promising method is the use of remotely controlled vehicles having robotic accessories for shell removal. Since the vehicles will perform highly risky operations, it is likely that they will be damaged or destroyed with some regularity. It is therefore preferred that such vehicles be as cheap and expendable as possible. One practical and relatively inexpensive way to obtain such vehicles is to modify small commercially available off-road vehicles. It is preferred that these modified vehicles be capable of both manual and robotic operation.

To meet part of the requirements just related, we have invented a mechanism for adapting an existing manually steered utility vehicle for both manual and powered remote steering control. This mechanism can be made cheaply in small quantities and does not require sophisticated manufacturing methods. Our mechanism is within the fabrication capacity of existing U.S. Army depots.

Our mechanism has a rigid adaptor subassembly on an existing frame extension of the vehicle, the adaptor subassembly comprising a base plate atop the frame extension and a bridge atop the base plate. Gussets fixed between the bridge and base plate stiffen the adaptor subassembly and also protect elements of a steering control subassembly mounted to the adaptor subassembly. The steering control subassembly has a post rotatable in a web of the bridge and a motorized actuator rotates the post. The actuator swingably mounts to one side of the bridge and has a quick-release connection to the post, so the actuator can be quickly decoupled from the post and the swung clear of other steering control elements. The steering control subassembly has linkage elements which rotate the vehicle's steering column without binding the column with a sleeve around the column. The linkage elements include a wing fixed to the post, the wing having two projections extending symmetrically from the post. Two rods pivotally connect the wing projections to corresponding projections of an adapter element on the steering column. The rods are on opposite sides, of and are equidistant from, a line from the steering subassembly's central axis to the steering column axis.

DETAILED DESCRIPTION

Figure 1:
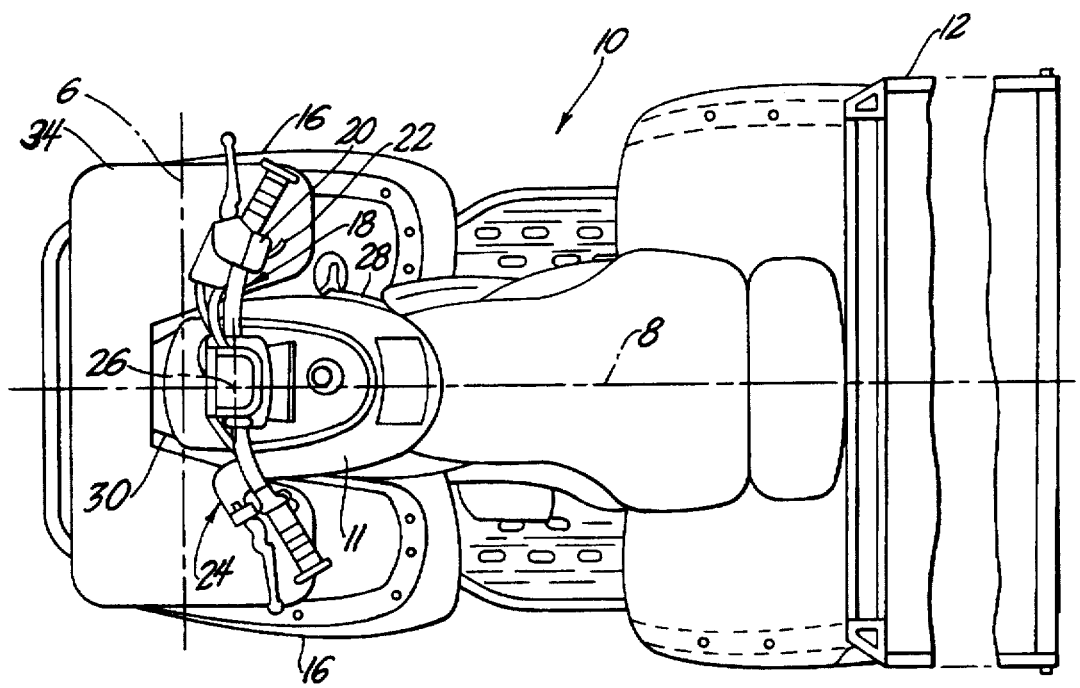
FIG. 1 is a partial plan elevational view of typical commercially available utility vehicle having a plate 34 of atop a forward frame extension of the vehicle.

In FIG. 1 is a common utility vehicle 10 having lateral axis 6, longitudinal axis 8 and a partly shown load bed 12. A conventional forward frame extension 14 (FIGS. 2–4) bolts conventionally directly to the vehicle's main frame (not shown) and is positioned over the forward part of the vehicle's front fenders 16. The bolt connections between the main frame and frame extension 14 are typically at internally threaded rods 42 and eyed rods 44 (FIGS. 3 and 4). The axes of rods 42 and 44 are respectively denoted by reference numerals 50 and 52, and as seen in FIG. 2, these axes form a trapezoidal pattern.

On the right side of handle bar subassembly 18 is a throttle control housing 20 and a throttle control lever 22 extending from housing 20 and on the left side of subassembly 18 is a manual brake actuator 24. Handle bar subassembly 18 connects to the vehicle steering column (not shown in FIG. 1) whose longitudinal central axis is represented at 26. Vehicle 10 also has a gear shift lever 28 for controlling the vehicle transmission and a central fixed head light 30.

Figure 2:
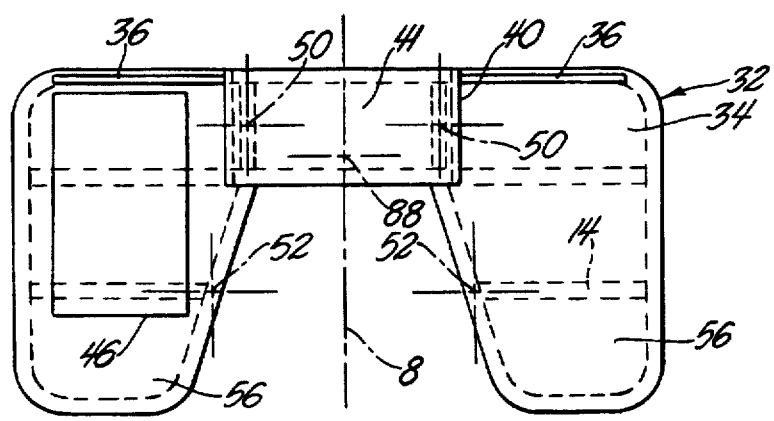
FIGS. 2, 3 and 4 are respective plan, side and front elevational views of an adaptor subassembly for mounting a steering control subassembly to the utility vehicle. The conventional vehicle forward frame extension is seen in these views.
Figure 3:
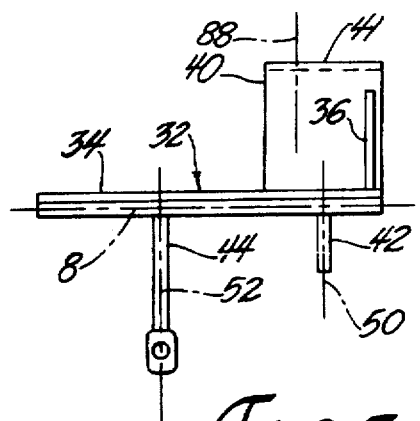
Figure 4:
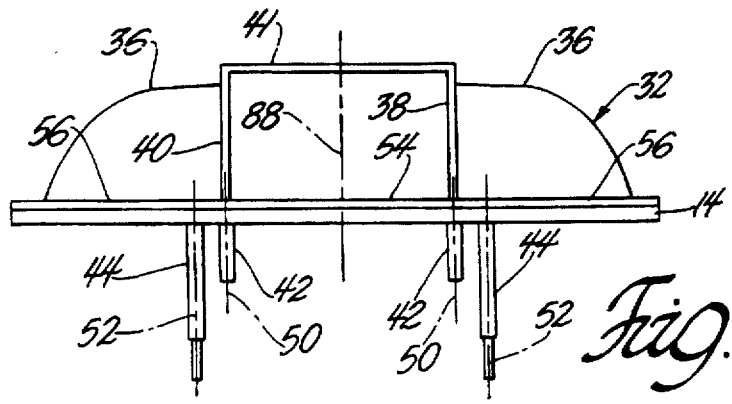

As seen in FIGS. 2, 3 and 4, we have fashioned a strong, rigid adaptor subassembly 32 which is used to mount a steering control subassembly 59 (FIG. 5) vehicle 10. Adapter subassembly 32 is fixed, typically by welding, on top of frame extension 14, subassembly 32 being shaped to fit or conform to the front 4 of vehicle 10. It is contemplated that subassembly 32 and frame extension 14 will be removed or installed together as a unit on vehicle 10 via bolt connections at rods 42 and 44. Subassembly 32 comprises a horizontal flat base plate 34 which is congruent with frame extension 14, fits around frontal body area 11 of vehicle 10 and serves as a mounting surface. Atop plate 34 is a channel bridge 40 having the general configuration of an inverted U, the bridge defining together with plate 34 a beam aperture 38 through which light from head lamp 30 passes. The portions of bridge 40 and plate 34 surrounding aperture 38 not only permit passage of a light beam, but they also serve as an anti-brush guard for head lamp 30. Bridge 40 also serves to reinforce plate 34 at its relatively narrow neck area 54 which connect lobes 56 of the plate. The web 41 of bridge 40 provides a horizontal mounting and locating surface for a steering control subassembly 59 (FIG. 5) that forms part of our invention. Web 41 is preferably higher than the tops of head lamp 30 and body area 11 in order to provide vertical clearance for elements of the steering control subassembly 59 connected to the underside of web 41 and disposed over body area 11.

Welded between the respective front zones of bridge 40 horizontal plate 34 are gusset plates 36, which are preferably upright. When vehicle 10 travels over terrain, plates 36 act as forward shields for components such as, for example, a circuit box 46 (FIG. 5) mounted on plate 34 or an actuator 48 (FIG. 5) mounted to bridge 40. As a result, such components are not hit by brush or debris from the forward direction during vehicle travel.

Figure 5:
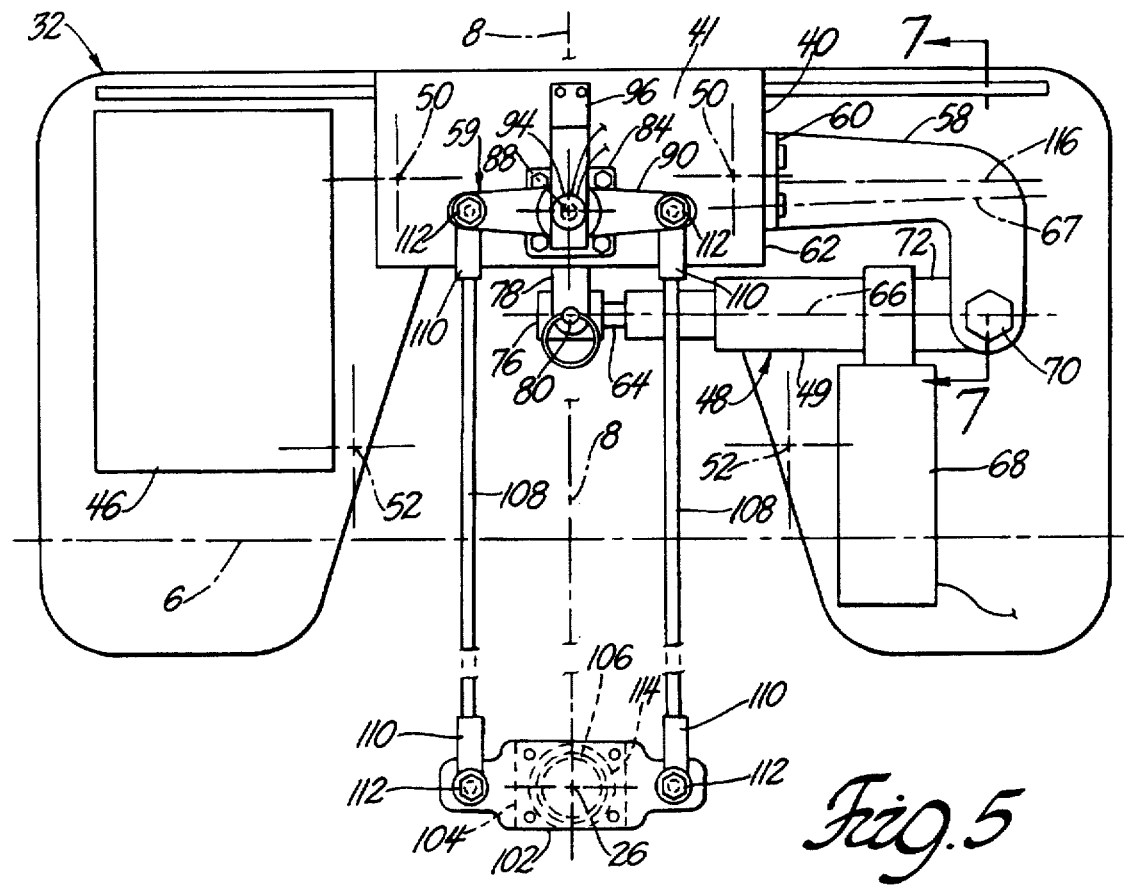
FIG. 5 is a plan elevational view of the steering control subassembly mounted on the adaptor subassembly.
Figure 7:
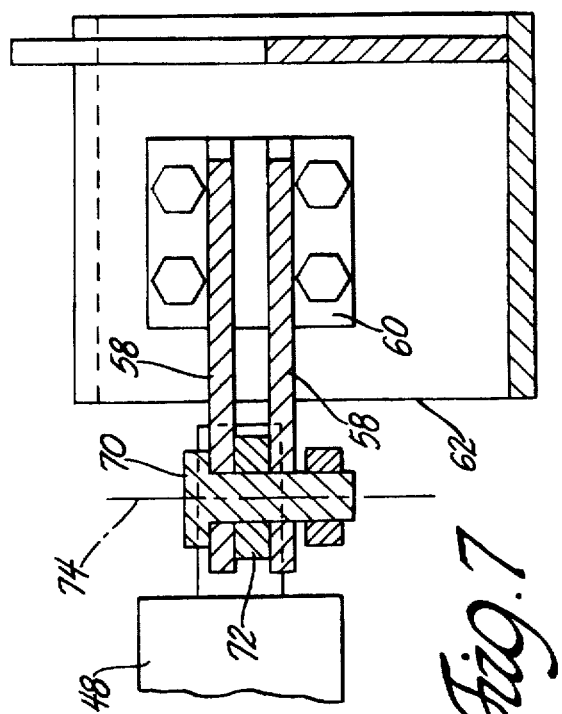
FIG. 7 is a view taken along line 7—7 in FIG. 5.

FIG. 5 shows steering control subassembly 59, which adapts vehicle 10 for remote steering control. As also seen in FIG. 7, the steering control subassembly is anchored to bridge 40 by a pair of curved legs 58 bolted at their common base 60 to one vertical side 62 of the bridge. Rotatably connected at the unanchored ends of legs 58 by pin 70 is actuator 48 having a housing 49. Fixed to housing 49 is apertured flat tab 72 fitting closely between arms 58 and closely receiving pin 70 so that the actuator's motion relative to legs 58 is limited to turning about axis 74 of pin 72. Actuator 48 has motor 68 for retracting and extending member 64 into and from 49 along translation axis 66. Member 64 is typically a mechanically driven rod but can be hydraulically driven piston, member 64 having an engagement terminus 76 affixed to the end thereof.

Figure 6:
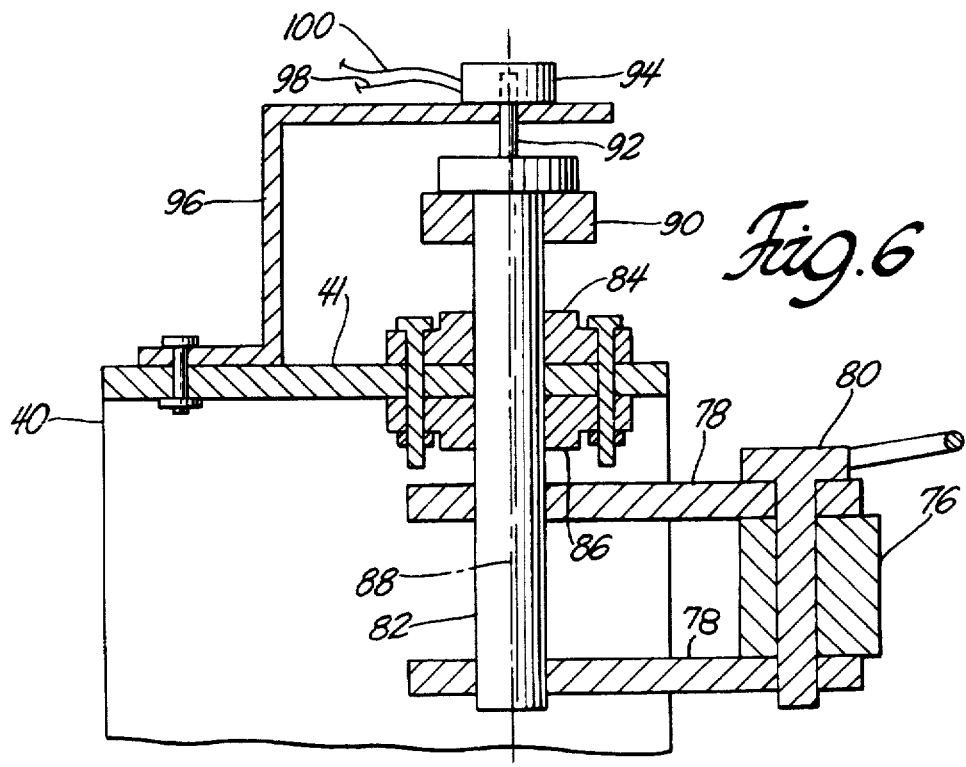
FIG. 6 is a sectional view of steering control subassembly components at a central axis of that subassembly.

As seen in FIGS. 5 and 6, engagement terminus 76 fits closely between flat parallel arms 78 and is pivotally connected therewith by quick-release pin 80, which rotatingly and closely engages arms 78 and terminus 76. Arms 78 are fixed to a rotator pin 82 which journals with web 41 of bridge 40 and journals with stepped web reinforcement blocks 84 and 86, these blocks being bolted to the under and upper surfaces of web 41. Blocks 84 and 86 reinforce web 41 in the area surrounding pin 82 and keep pin 82 in alignment with main subassembly axis 88. Welded to rotator pin 62 is symmetric wing 90 extending laterally in either direction from axis 88. Also fixed to pin 82 is shaft 92 that is concentric with axis 88. Shaft 92 turns feedback-sensor pot 94, which is held in fixed relation to web 41 by "Z" bracket 96 and which has signal lines 98 and 100 communicated with circuit box 46.

Spaced from wing 90 along vehicle longitudinal axis 8 is an adapter plate 102 centered on steering column axis 26. Plate 102 is bolted to steering column flange 104 at bolt holes 130 (FIG. 8), which are sized and arrayed to match the hole size and pattern of like bolt holes in flange 104. Flange 104 is fixed concentrically to, and typically is integral with, steering column 106 of vehicle 10. A pair of extension rods 108 are each pivotally connected between wing 90 and adaptor plate 102, the rods lying on opposite sides of longitudinal axis 8 and lying equally distant therefrom. The rods' connection between the wing and adaptor plate are comprised of eyed rod ends 110 and hinge bolts 112 passing therethrough, bolts 112 also passing through the outer extremities respectively of wing 90 and plate 102. Plate 102, wing 90 rods 108, rod ends 110 and hinge bolts together form a parallelogram unit whose are sides are hinged to move in concert, the two rods 108 moving in opposite directions relative to longitudinal axis 8 of vehicle 10.

Because of the parallelogram unit there are no appreciable net longitudinal forces between main subassembly axis 88 and steering column axis 26 when actuator 48 turns wing 90 and steering column 106. Consequently, any binding between steering column 106 and column sleeve 114 is minimized when actuator turns steering column 106. Such binding can occur, for example, if wheels of vehicle 10 greatly resist turning of column 106 when vehicle 10 is at rest or travelling slowly. Just as the parallelogram unit minimizes binding of steering column 106, this unit also minimizes binding of rotator pin 82 with web 41 and web reinforcement blocks 84 and 86.

A similar effect to that of the aforementioned parallelogram unit results from the juxtaposition of legs 58, the actuator rod's translation axis 66 and main subassembly axis 88. Specifically, central axes of the laterally extending portions of legs 58 are farther forward relative to longitudinal axis 8 than subassembly axis 88, whereas translation axis 66 is further aft relative to longitudinal axis 8 than is subassembly axis 88. Thus, when actuator rod 64 translates along axis 66, two oppositely directed lateral forces are created: one force is aft of subassembly axis 88 and is directed along axis 66, and the other force is forward of subassembly axis 88 in is parallel to central axes 116. These two oppositely directed lateral forces are located on opposite sides of reference line 67 extending laterally outward from axis 88 parallel to axis 66. As a consequence of the direction and location of the aforementioned opposed lateral forces, binding of pin 82 with web 41, block 84 and block 86 is minimized.

As control subassembly 59 steers vehicle 10, the above longitudinal forces along arms 108 and lateral forces along axes 106 and 66 act on adaptor subassembly 32, which anchors control subassembly 59. These forces are essentially completely resolved into a net torsional force centered on axis 88. As appreciated from FIG. 5, axis 88 is laterally and longitudinally within a generally trapezoidal array formed by axes 50 and 52 of respective rods 42 and 44, which fix subassembly 32 to the frame of vehicle 10. The average distance from axis 88 to the rod axes is smaller than if axis 88 were longitudinally and laterally outside the trapezoidal array of rod axes, thereby reducing the sum of twisting moments on the rods caused by the aforementioned net torsional force about axis 88. An advantage of reduced twisting moments is that no added connections are needed between adaptor 32 and the vehicle frame to counteract forces created by operation of steering control subassembly 59.

Figure 8:
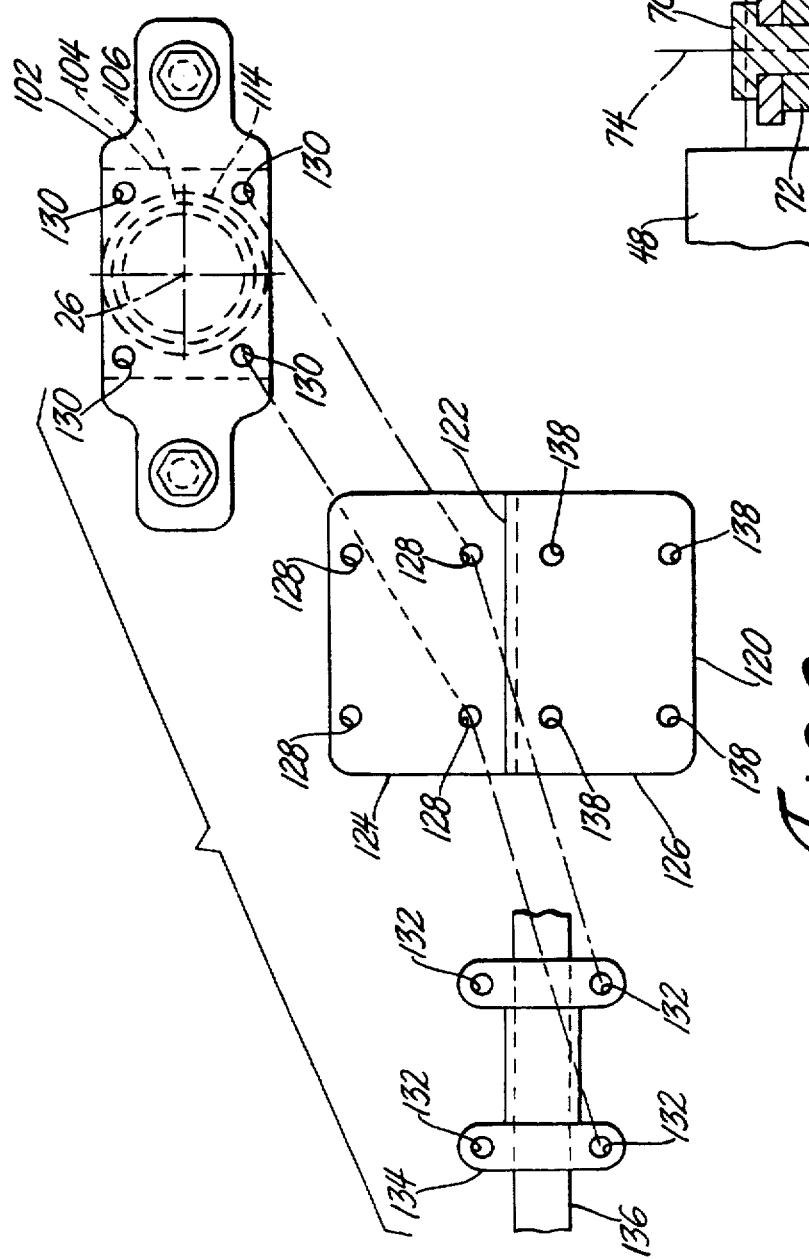
FIG. 8 is an exploded view of components of the steering control subassembly that mount to the vehicle steering column.

Shown in FIG. 8 is a Z-shaped accessory mounting member 120 having a vertical web 122 and horizontal webs 124 and 126. Member 120 has an rectangular array of four bolt holes 128 that register both with a first complimentary array of bolt holes 130 in adaptor plate 102 and with a second complimentary array of bolt holes 132 in handle bar clamp 134. Clamp 134 is a common element for retaining handle bar 136 on steering column flange 104, and clamp 134 would conventionally be bolted directly to this flange. However, we interpose adaptor plate 102 and mounting member 120 between flange 104 and clamp 134 and bolt all of these elements together. Web 126 of member 120 preferably has a rectangular pattern of bolt holes 138 which are capable with registry with respective patterns formed by bolt holes 130 and 132. The preferred bolt pattern of web 126 has two advantages. First, web 126 will accept vehicle accessories such as gauges that were designed to mount through pre-existing holes 130 and 132. Second, member can be fixed between plate 102 and clamp 104 in numerous positions using either two or four of the member's bolt holes, whereby member 120 allows attachment of a wide variety of accessory configurations at the vehicle's steering column.

We wish it to be understood that we do not desire to be limited to the exact details of construction or method shown herein since obvious modifications will occur to those skilled in the relevant arts without departing from the spirit and scope of the following claims.

What is claimed is:

1. A mechanism for retrofitting a manually steered vehicle for remote steering control, wherein the vehicle has a frame, a steering column and a steering column axis about which the steering column rotates, the mechanism comprising:

a steering control subassembly;

means for mounting the steering control subassembly to the vehicle, the mounting means comprising a rigid adapter subassembly adapted to be solidly fixed to the frame;

a bridge of the adapter subassembly immobile relative to the adaptor subassembly, the bridge having two sides spanned by a web;

a central axis of the steering control subassembly extending through the web;

a post of the steering control subassembly concentric with the central subassembly axis and rotatably engaged to the web;

actuator means of the steering control subassembly mounted to the adapter subassembly for rotating the post under nonmanual power;

a wing fixed to the post, two projections of the wing extending in different directions from the post;

an adapter element having two adapter element portions, the adapter element adapted to be fixed to the steering column such that the adapter element portions extend in different directions away from the steering column;

a first rod pivotally connected between one of the wing portions and one of the adapter element portions;

a second rod pivotally connected between another of the wing portions and another of the adapter element portions.

2. The mechanism of claim 1 wherein the vehicle has a head lamp and wherein the adapter subassembly further comprises:

lobes fixed to the rigid adapter subassembly;

a neck connecting the lobes and fixed to the bridge, the neck and bridge together defining a light passage aperture and frontal guard for the head lamp.

3. The mechanism of claim 2 further comprising dual purpose means for stiffening the adapter subassembly and for protecting elements mounted to the lobes and to the sides of the bridge, the dual purpose means comprising gussets fixed between respective forward zones of the sides and lobes.

4. The mechanism of claim 1 wherein the steering control subassembly further comprises:

an actuator housing of the actuator means;

an actuator member translatable into and from the housing;

a mounting leg fixed to the adaptor subassembly;

a swing connection between the mounting leg and the actuator housing, whereby the actuator housing and the actuator member can be swung relative to the adaptor subassembly about the swing connection;

a pivot arm of the actuator means fixed to the post;

a quick-release hinging connection between the actuator member and the pivot arm.

5. A mechanism for retrofitting a manually steered vehicle for remote steering control, whereby the vehicle is both manually and remotely steerable, wherein the vehicle has a frame, a removable forward extension of the frame, a steering column sleeve, a steering column rotatable within the sleeve and a steering column axis about which the steering column rotates, the mechanism comprising:

a steering control subassembly;

means for mounting the steering control subassembly to the vehicle, the mounting means comprising a rigid adapter subassembly adapted to be solidly fixed to the forward extension;

a bridge of the adapter subassembly immobile relative to the adaptor subassembly, the bridge having two sides connected by a web;

a central axis of the steering control subassembly extending through the web;

a post of the steering control subassembly concentric with the central subassembly axis and rotatably engaged to the web;

means both for reinforcing the web and maintaining the post in concentric relation to the central axis, the reinforcing and maintaining means comprised of journal blocks fixed to upper and lower surfaces of the web;

actuator means of the steering control subassembly mounted to the adapter subassembly for rotating the post under nonmanual power;

means of the actuator means for achieving nonbinding rotation of the steering column, the achieving means comprising a symmetric wing fixed to the post, two projections of the wing extending from the post away from each other, an adapter element having two adapter element portions extending away from one another, the adapter element adapted to be fixed to the steering column such that the adapter portions extend away from the steering column, a first rod pivotally connected between one of the wing portions and one of the adapter element portions, a second rod pivotally connected between another of the wing portions and another of the adapter element portions, wherein the first and second rods are positionable to lie equidistantly on opposite sides of a line extending from the central subassembly axis to the steering column axis.

6. The mechanism of claim 5 wherein the vehicle has a head lamp and wherein the adapter subassembly further comprises:

lobes fixed to the rigid adapter subassembly;

a neck connecting the lobes and fixed to the bridge so that the neck reinforces the bridge, the neck and bridge together defining a light passage aperture and frontal guard for the head lamp;

wherein the lobes are adapted to be fixed to the forward extension of the frame such that the light passage aperture and the frontal guard are at the head lamp.

* * * * *